Jan. 3, 1961     F. K. MUELLER     2,966,744

GYROSCOPIC THEODOLITE ASSEMBLY

Filed July 18, 1958     2 Sheets-Sheet 1

FRITZ K. MUELLER,
INVENTOR.

BY W. E. Thibodeau,
Victor L. Billings,
A. T. Dupont and
Alvin E. Moore,
ATTORNEYS.

Jan. 3, 1961 F. K. MUELLER 2,966,744
GYROSCOPIC THEODOLITE ASSEMBLY
Filed July 18, 1958 2 Sheets-Sheet 2

FRITZ K. MUELLER,
INVENTOR.
BY W. E. Thibodeau,
Victor L. Billings,
A. T. Dupont and
Alvin E. Moore,
ATTORNEYS.

United States Patent Office 2,966,744
Patented Jan. 3, 1961

2,966,744

GYROSCOPIC THEODOLITE ASSEMBLY

Fritz Kurt Mueller, 527 Lowell Drive, Huntsville, Ala.

Filed July 18, 1958, Ser. No. 749,569

8 Claims. (Cl. 33—72)

(Granted under Title 35, U.S. Code (1952), sec. 266)

The invention described herein may be manufactured and used by or for the Government for governmental purposes without the payment of royalty thereon.

This invention relates to a gryoscopic theodolite assembly, comprising a combined north-seeking gyrocompass, horizontal-angle adjusting means and angle indicators. Such a device may be used to measure the azimuth of a datum line, plane or object, and thus is of value, for instance, in determining or adjusting the lay of a missile, artillery piece, line-throwing gun, or architectural element.

One of the problems in obtaining an accurate instrument of this type lies in the inherent tendency of the north-seeking gyrocompass to oscillate about its vertical axis as it continually moves to keep its spin axis pointed toward true north. Such continual oscillation tends to generate friction in the bearings that support the gyroscope casing or can on its vertical axis. The resulting frictional couple about this axis tends to cause the gyroscope to precess in such a way as to cock its direction-indicating shaft into an improper and inaccurate position. In view of these facts, one of the objects of this invention is to provide a gyroscopic theodolite assembly in which the north-seeking gyrocompass is freely mounted on air or gaseous bearings which are nearly frictionless.

Another object of the invention is to provide, in combination with said gaseous bearings, a low-friction electrical connection means between the oscillating casing of the gyrocompass and its relatively fixed support, thus obviating or reducing the frictional couple on the casing's vertical axis due to such connection.

A further object of the invention is to provide a gyroscopic theodolate, usable in measuring or determining the azimuth angles of missiles or other laid objects, in which the period of the gyroscope's oscillation is relatively short, thus permitting a quick ascertainment of the direction of true north and a quick reading of the base angle of the transit theodolite, from which angle the azimuth of the object transited by the telescope is measured.

The foregoing and other objects of the invention will become more fully apparent from the following detailed description of exemplary structure embodying the invention and from the accompanying drawings, in which.

Figure 1:
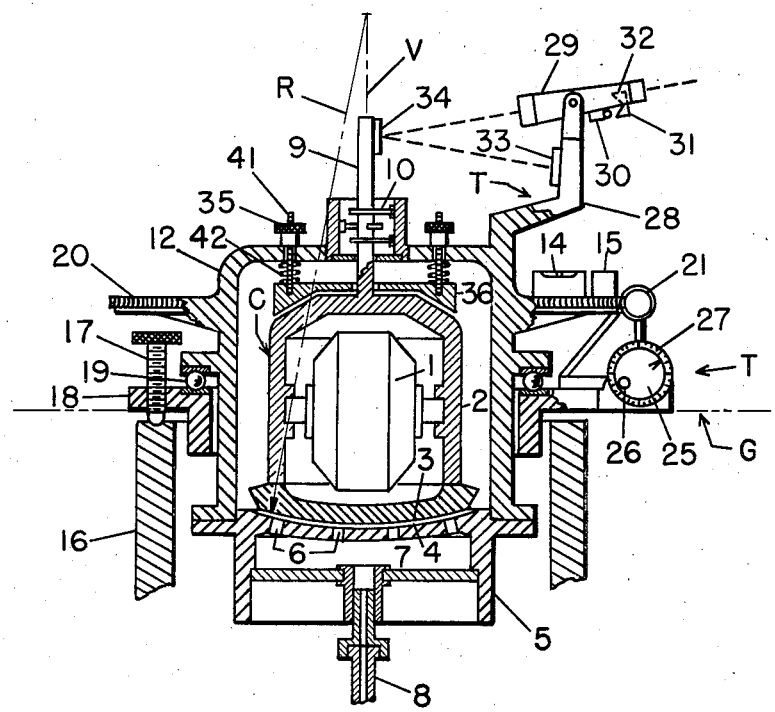
Fig. 1 is an elevational view, mainly in section taken axially through the gyroscope theodolite.

With reference to the drawings, the invention comprises a gyrocompass C and a combined collimator and theodolite T.

The gyrocompass C comprises a gyroscope 1 that has an electrically turned rotor of a known type, rotating on spin axis G. When this axis is in the middle position of the gyroscope's oscillation it indicates the direction of true north. Such indication is momentary because of the earth's rotation and the confinement of the gyroscope's spin axis to a horizontal plane, which in all non-equatorial latitudes is not parallel to the earth's axis and therefore leads to precessional couples on the gyroscope.

To prevent any appreciable frictional couple about axis V which might arise from the bearing which pendulously supports the gyroscope's casing or frame 2, an air or gaseous bearing is utilized. This bearing comprises convex surface 3 on the lower part of casing 2, concave surface 4 on support element 5, and a film of air or other gas that is formed in the clearance between 3 and 4 during the functioning of the gyrocompass. To this clearance compressed air or other gas is supplied, through ports 6, from manifold 7 and a source 8 of the compressed gas, which is shown as a tube that is broken away, but which comprises a known type of gas reservoir or compressor.

Figure 2:
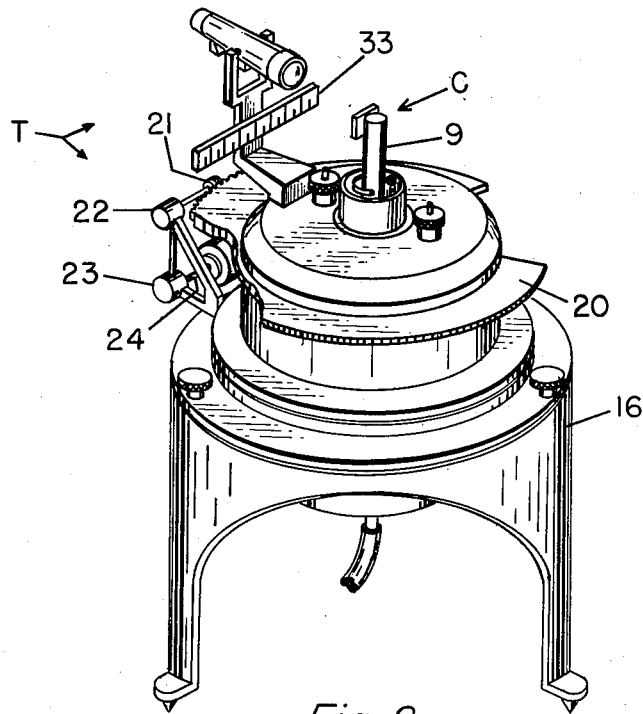
Fig. 2 is a perspective view of the type of theodolite assembly shown in Fig. 1, with a segmental gear substituted for the annular gear 20 of Fig. 1.
Figure 3:
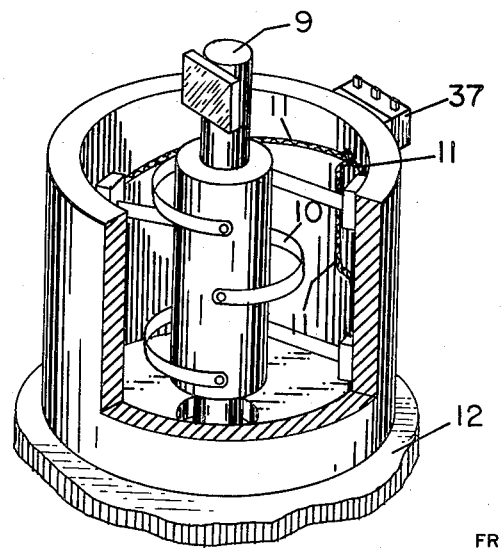
Fig. 3 is a detail view, partly in section, showing one form of the low-friction electrical connection.

The other connection between oscillating casing 2 and its support may comprise, as shown in the modification of Figs. 1 to 3, spiral springs 10 made of electrically conductive material, through which current is supplied from the three conductors 11 that are connected with terminal 37 and any primary source of electricity. Springs 10 are of sufficient strength for their return to an uncompressed position at one extreme of the oscillation of stem 9, but are weak enough to yield readily when they are wound around stem 9 to the opposite extreme of said oscillation. One of the resilient conductors 10 is spirally wound relative to stem 9 in one direction and another conductor is spirally wound relative to the stem in the opposite direction.

It is obvious that conductors 10 optionally could be made of flexible solid material that is not resilient, or could be replaced by any other type of electrical conducting means which imposes little or no friction to impede the oscillation of stem 9.

Figure 4:
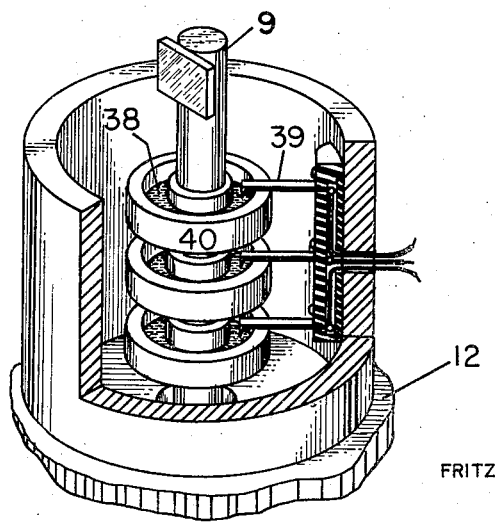
Fig. 4 is a detail view in section showing another embodiment of the electrical connection.

In the modification of Fig. 4 a low-friction connection that utilizes mercury 38, in lieu of conductors 10, is shown. The lower points of conductors 39 dip shallowly in the mercury of each of the cups 40, transmitting current with a minimum of friction.

The nearly frictionless nature of the electrical connection and of the gaseous bearing greatly reduces and almost eliminates inaccuracy-causing torques about axis V. At the same time the gaseous bearing also provides structure which considerably reduces the period of oscillation of stem 9 to each side of the true north direction.

In conventional gyrocompasses this period is frequently nearly half an hour. Since several complete cycles of oscillation are required to determine the direction of true north with the degree of accuracy needed in the laying of a ballistic or satellite-propelling missile or of a large gun, a shortening of the period of oscillation is desirable. An attempt to achieve this result in the past has been made by adding a weight to the bottom of a floated, spherical gyroscope casing in a gyrocompass. In the structure of this invention such shortening is achieved without the necessity of providing a weight separate from that of the casing. Optionally, the bottom of the casing may be made heavier by thickening part of its extent, as by the provision of a flange at its point of juncture with the casing cylinder, as illustrated in Fig. 1. In any event, the major means of this invention for shortening or controlling the oscillation period is shown in Fig. 1 as comprising surfaces 3 and 4 which have a relatively long radius of curvature R, centered at a point above the gyrocompass. This point or center of curvature of the curved bearing surfaces is claimed as remote from these surfaces; thus, as shown in the drawing, the center is more than three times the diameter of the gyroscopic rotor from bearing surfaces 3 and 4, and also is outside the structure of the instrument support 5–12. But it may be considerably farther than this relative distance. The type of bearing utilized, comprising interfitting curved surfaces and an air-bearing film of gas, is such that, obviously, the only theoretical limit to the length of the quasi pendulous arm is reached when the bearing surfaces cease to be curved and become flat. In practice, however, there is sufficient curvature of the bearing surfaces to provide for retention of the two surfaces in interfitted relationship. This long radius shortens the period of oscillation due to the fact that such oscillation is caused by precession of the gyroscope, which in turn is caused by the moment of the couple between the center of gravity of the freely mounted part of the gyrocompass and the point of pendulous support of said part. This moment is equal to the product of the force (weight) and the length of the arm between the center of gravity and the point of support. As the earth turns, and the gyroscope, in its usual position off the equator, tends to continue pointing in the same direction in space, the line between said center of gravity and the point of pendulous support of the rotor becomes no longer vertical, thus placing a precessing force on the gyroscope. This force causes the gyroscope to oscillate back to its true-north position. But the movement of its axis does not stop in the north-south line. This is because there is no damping or anti-hunting means on the freely mounted gyroscope; consequently its momentum carries its north-seeking axis beyond the north-south line; and in this position the center of gravity is off the vertical in a direction opposite to its first imbalance. Thus an opposite precession-causing force arises; and an opposite oscillatory, movement of the gyroscope's axis occurs.

The period of this oscillation is an important factor in the present invention. This time, T in minutes, is expressed in the following, simplified, basic equation:

$$T = 2\pi \sqrt{\frac{I}{GAW \cos L}}$$

in which:

$I$ = angular momentum of the gyroscope;
$G$ = weight of the oscillating element;
$A$ = distance between the point of pendulous support and the center of gravity of the freely mounted part of the instrument;
$W$ = rotational velocity of the earth;
$L$ = latitude of the instrument.

The period therefore is inversely proportional to the weight, to the distance between the point of free support and the center of gravity, to the rotational velocity of the earth, and to the latitude of measurement. Since the last two of the above-mentioned factors are fixed at a given point on the earth, the time of oscillation may be reduced only by increasing the weight, or the distance between the point of pendulous support and the center of gravity, or both the weight and said distance.

Increasing the weight has the disadvantages of extra bulk, mass to be transported, and more load in the gyroscope-supporting bearings. Increasing the length of the known type of pendulous support, comprising a thin, narrow, metallic band that twists during the oscillation, does not help because this band is not rigid, is bent during its oscillation, and presents obvious mechanical and space difficulties. Moreover, the oscillation of such a band is opposed by the resistance to torsion of its material.

In this invention the equivalent of a pendulous support point that is well above and outside the gyrocompass is provided at the center of curvature of the radius R. The curvature of surfaces 3 and 4 and the thin air film between them force the instrument to move pendulously, as if it were pendulously supported at the center of curvature. Since the radius R is relatively very long, being in practice six to ten feet or even longer, the center of gravity of the freely mounted part of the gyrocompass, which is near surfaces 3 and 4, is relatively far from the center of curvature of radius R. Therefore, the distance between the center of curvature (which is in effect the point of pendulous support) and the center of gravity is nearly as long as the radius of curvature; and according to the above equation the period of oscillation is greatly reduced by this long radius.

The above-described gyrocompass may be used alone, to indicate the north-south direction, or may be used in combination with a theodolite.

The combined collimator and theodolite T comprises a housing 12 within which the gyrocompass is pendulously supported by means of the air bearing. Housing 12 supports leveling devices 14 and 15 on a datum plane that is adjustable, due to the mounting of housing 12 on support 16 by means of three screws 17. The screws 17 are screwed into or out of support element 18 to adjust said datum plane to a horizontal position.

Housing 12 is also adjustably mounted for rotation about axis V by means of antifriction bearings 19, worm wheel 20, worm 21, bevel gears which are housed in casings 22 and 23 (Fig. 2), shaft 24, hand wheel 25 and crank 26. The arrow shown on wheel 25 points to one of various graduations, totaling 360°, that are indicated on scale 27, which is fixed to element 18.

The worm wheel is shown as an annular gear, 20, in Fig. 1, but in lieu thereof a segmental gear may be utilized, such as is shown in Fig. 2.

Arm 28 on housing 12 pivotally supports a collimator which comprises a telescope 29, a source of light 30 and prismatic light reflectors 31 and 32. Arm 28 also supports a light-reflecting scale 33; and oscillating stem 9 supports an intermediate reflector or mirror 34, which receives collimated light from reflector 32, transmits the light beam to reflecting scale 33, receives the light beam reflected from 33 and transmits the returning beam into telescope 29.

The instrument is prepared or caged for transport from one place of use to another by screwing nuts 35 counter-clockwise on threaded stems 41 which are fixed to annular flange 36, thus allowing springs 42 to force said flange into tight enegagement with casing 2, with equalized pressure of 36 on casing 2, due to the springs. The springs also serve as shock absorbers.

In utilizing the device of this invention to measure and/or determine the direction of the lay of a missile, artillery piece or other object, the instrument is set up near the object and leveled by adjustment of screws 17. Caging flange 36 is screwed away from 2 and gyroscope 1 is set in rotation. Gyrocompass stem 9 and mirror 34 thus are placed in oscillation about the direction of true north. Handwheel 25–26 is then turned until the line of sight through telescope 29 is approximately in the line of true north. Such turning may be continued until said line of sight is exactly toward true north—that is, until the collimated light strikes scale 33 at 0° when it is at the mid-point of the oscillation of reflecting mirror 34. Such fine accuracy at this point, however, is not necessary as the average of the readings of the oscillatory extremes easily may be computed, and the resulting figure added to or substracted from the final reading on the object whose azimuth angle is measured.

The time necessary for thus determining this average reading from scale 33 is relatively short, due to the long radius R of the gyrocompass.

After the average figure from scale 33 thus is obtained the theodolite is transited, by turning handwheel 25–26, while the collimated light beam is reflected from a mirror that is perpendicularly located relative to the datum line on the measured object. When this beam is reflected directly into the line of sight of the telescope, a final reading on scale 27 is obtained. This reading is algebraically added to the earlier reading from scale 33; and the resulting number of degrees is the azimuth angle of the missile or other object. The lay of this object may then be shifted until said datum line is at any desired azimuth angle.

The invention comprehends various obvious changes in structure from that herein illustrated within the scope of the appended claims.

The following invention is claimed:

1. A gyrocompass assembly comprising: a hollow, metallic support having a top element, a bottom element and side elements that join said top and bottom elements; bearing means mounting said support for rotation about a verical axis; a frame mounted inside said support between said top and bottom elements, of a shorter vertical extent than the space between said top and bottom elements in all positions it assumes during operation of said assembly; an element mounted on said frame projecting upward past said top element to a point above said top element, free to tilt and oscillate relative to said top element, said element mounted on said frame having a surface that is visible from a point adjacent to said support; bearing means for mounting said frame inside said hollow support for tilting relative to a vertical line and oscillation about said line by means of a gaseous film, said bearing means comprising convex and concave surfaces on said frame and support, said last-named surfaces having substantially the same center of curvature, and means for supplying compressed gas to form said film between said convex and concave surfaces, the center of curvature of said convex and concave surfaces being located outside of said support and remote from said convex and concave surfaces; a gyroscope mounted on said frame for rotation on a horizontal axis, means for rotating said gyroscope, thus causing said frame to have oscillatory precession about a vertical axis and on said gaseous film; and means for establishing a line of sight on said visible surface, which line of sight, extended, intersects said vertical axis and is in the vertical plane of the north-south direction, said direction being momentarily assumed by said horizontal axis at the mid point of its precession.

2. A device as set forth in claim 1, in which said line-establishing means comprises mechanism for rotating said line of sight into the said north-south plane and for holding said line of sight in adjusted position.

3. A device as set forth in claim 1, in which said line-establishing means comprises an optical instrument.

4. A device as set forth in claim 1, in which said line-establishing means comprises means for collimating and projecting on said surface a beam of light.

5. A device as set forth in claim 4, in which said surface is a reflector.

6. A device as set forth in claim 5, in which said line-establishing means further comprises a scale on which said beam is reflected from said reflector.

7. A device as set forth in claim 1, in which said element mounted on said frame is a stem of said frame, projecting outside said support.

8. A gyrocompass comprising: a hollow support comprising a top element having a passage extending upward from the hollow space in said support; a gyroscope housing mounted within said support, operatively free to tilt and oscillate within said support, and comprising an element extending thru, and clear of the walls of, said passage to a point above said support, said element having a surface that is visible from a point adjacent to said support; bearing means for mounting said housing inside said support for tilting about a center of curvature that is remote from said support and for oscillation about a vertical axis, said bearing means comprising a convex surface on said housing having its curvature centered at said center of curvature, a concave surface on said support having substantially the same curvature and center of curvature as said convex surface, and means for supplying compressed gas to form a thin, gaseous film between said convex and concave surfaces; a gyroscope mounted in said housing for rotation on a horizontal axis; means for rotating said gyroscope, thus causing said housing to have oscillatory precession about said vertical axis and on said gaseous film; said element having a visible surface being constructed and arranged to indicate the north-south direction, which direction is momentarily assumed by said horizontal axis at the mid point of its precession.

References Cited in the file of this patent

UNITED STATES PATENTS

| 1,541,775 | Bibbins | June 9, 1925 |
| 1,743,533 | Davis | Jan. 14, 1930 |

FOREIGN PATENTS

| 48,655 | Netherlands | June 15, 1940 |
| 504,912 | Great Britain | Apr. 28, 1939 |
| 842,272 | Germany | Dec. 18, 1952 |